United States Patent
Yamaguchi (10) Patent No.: US 10,747,704 B2
(45) Date of Patent: Aug. 18, 2020

(54) ELECTRONIC UNIT HAVING A USB HOST CONNECTED TO A USB DEVICE

(71) Applicant: TOYOTA JIDOSHA KABUSHIKI KAISHA, Toyota-shi, Aichi-ken (JP)

(72) Inventor: Ui Yamaguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/377,369

(22) Filed: Apr. 8, 2019

(65) Prior Publication Data

US 2019/0347234 A1    Nov. 14, 2019

(30) Foreign Application Priority Data

May 11, 2018 (JP) ................ 2018-092237

(51) Int. Cl.

| G06F 13/40 | (2006.01) |
|---|---|
| B25J 9/16 | (2006.01) |
| G06F 1/3215 | (2019.01) |
| G06F 13/38 | (2006.01) |
| G06F 1/26 | (2006.01) |
| G06F 3/00 | (2006.01) |

(52) U.S. Cl.
CPC .......... *G06F 13/4081* (2013.01); *B25J 9/16* (2013.01); *G06F 1/266* (2013.01); *G06F 1/3215* (2013.01); *G06F 3/00* (2013.01); *G06F 13/385* (2013.01); *G05B 2219/30* (2013.01); *G06F 2213/0042* (2013.01)

(58) Field of Classification Search
CPC .... G06F 1/266; G06F 13/4081; G06F 13/385; G06F 2213/0042
See application file for complete search history.

(56) References Cited

U.S. PATENT DOCUMENTS

| 10,158,342 | B1* | 12/2018 | Takamine | ............... H01L 23/66 |
|---|---|---|---|---|
| 2004/0140787 | A1 | 7/2004 | Okamoto et al. | |
| 2004/0164697 | A1 | 8/2004 | Iribe | |
| 2008/0231221 | A1 | 9/2008 | Ogawa | |
| 2011/0317384 | A1* | 12/2011 | Makaibara | ........... H05K 1/0233 |
| | | | | 361/764 |
| 2014/0277723 | A1 | 9/2014 | Nishimura et al. | |
| 2017/0347454 | A1* | 11/2017 | Harashima | ............... H05K 1/18 |

(Continued)

FOREIGN PATENT DOCUMENTS

| JP | H07-049711 A | 2/1995 |
|---|---|---|
| JP | 2004-086359 A | 3/2004 |
| JP | 2004-188535 A | 7/2004 |

(Continued)

*Primary Examiner* — Glenn A. Auve
(74) *Attorney, Agent, or Firm* — Oliff PLC (57) ABSTRACT

An electronic unit includes a USB host and a USB device. After the USB host and the USB device are connected to each other by a USB cable, a signal requesting for a connection permission is transmitted from the USB device to the USB host, and the USB host determines whether to permit a connection based on the signal. The electronic unit further includes a power supply configured to supply power to the USB device, and an additional GND pattern different from a GND pattern of the USB cable is electrically connected to a GND of the USB port of at least one of the USB host and the USB device. An area of the additional GND pattern is 2000 mm² or more.

5 Claims, 6 Drawing Sheets

(56) References Cited

U.S. PATENT DOCUMENTS

2020/0044396 A1\*  2/2020  Ito .......................... H01R 12/71

FOREIGN PATENT DOCUMENTS

| JP | 2006-021287 A | 1/2006 |
| JP | 4550849 B2 | 9/2010 |
| JP | 4683073 B2 | 5/2011 |
| JP | 5668770 B2 | 2/2015 |
| JP | 6036647 B2 | 11/2016 |
| JP | 2017-138154 A | 8/2017 |
| JP | 2017-150902 A | 8/2017 |

\* cited by examiner

ELECTRONIC UNIT HAVING A USB HOST CONNECTED TO A USB DEVICE

CROSS REFERENCE TO RELATED APPLICATIONS

This application is based upon and claims the benefit of priority from Japanese patent application No. 2018-092237, filed on May 11, 2018, the disclosure of which is incorporated herein in its entirety by reference.

BACKGROUND

The present disclosure relates to an electronic unit.

An electronic unit including a USB host and a USB device that can be connected to each other by a USB cable with a GND (ground) via a USB port included in each of the USB host and the USB device is known. Japanese Unexamined Patent Application Publication No. 2004-086359 discloses a configuration in which the USB host is a PC and the USB device is a terminal.

SUMMARY

According to the USB 2.0 specification, a current value supplied from a USB host to a USB device is set lower before a connection is permitted by the USB host than after the connection is permitted. That is, according to the USB 2.0 specification, the current value supplied from the USB host to the USB device can be increased to 500 mA after the connection is permitted but is limited to 100 mA before the connection is permitted.

However, there are USB devices that are designed not based on the USB 2.0 specification and instead, for example, based on the fact that a current value (e.g., 500 mA) greater than a current value (100 mA) specified in this specification is supplied from a USB host to a USB device before a connection is permitted by the USB host. For example, many sensor-based devices use USB for a physical layer and require a supply of a current exceeding 100 mA to a USB host before a connection is permitted by the USB host. An operation of such a USB device may become unstable because a necessary current is not supplied before a connection is permitted, thereby leading to, for example, an initialization operation failure and thus an unstable startup.

In order to address such a problem, an external power supply terminal is provided in a USB device, and a current is supplied from an external power supply to the USB device via an AC adapter or the like. However, even when a sufficient current is supplied from the external power supply to the USB device before a connection is permitted by a USB host, an operation of the USB device may not become stable in some cases.

The present disclosure has been made in view such circumstances. An object of the present disclosure is to provide an electronic unit capable of effectively preventing stability of an operation from deteriorating for a USB device requiring a current value exceeding a current value setting in the USB 2.0 specification before a connection is permitted by a USB host.

An example aspect of the present invention is an electronic unit including: a USB host and a USB device that can be connected to each other by a USB cable with a GND via a USB port included in each of the USB host and the USB device. After the USB host and the USB device are connected to each other by the USB cable via the USB port, a signal requesting for a connection permission is transmitted from the USB device to the USB host, and the USB host determines whether to permit a connection based on the signal. The electronic unit further includes: a power supply configured to supply power to the USB device; and an additional GND pattern different from a GND pattern of the USB cable is electrically connected to a GND of the USB port of at least one of the USB host and the USB device. An area of the additional GND pattern is 2000 $mm^2$ or more.

It has been experimentally confirmed that the larger the area of the additional GND pattern, the smaller the potential difference between the GNDs becomes. It has been further experimentally confirmed that when the area of the additional GND pattern is set to 2000 $mm^2$ or more, a USB device startup success rate is improved to about 80%. Therefore, in the electronic unit according to the present disclosure, it is possible to effectively prevent the stability of the operation from deteriorating for the USB device requiring the current value exceeding the current value setting in the USB 2.0 specification before the connection is permitted by the USB host.

The area of the additional GND pattern may be 4000 $mm^2$ or more. Further, when the area of the additional GND pattern is set to 4000 $mm^2$ or more, it can be considered that the USB device startup success rate can be made almost 100%. Therefore, it is possible to effectively prevent the stability of the operation from deteriorating for the USB device requiring a current value exceeding a current value setting in the USB 2.0 specification before a connection is permitted by the USB host.

The additional GND pattern may be provided in a GND connection path connecting the power supply to a GND of the USB device.

The USB host and the USB device may be connected to each other with relay means interposed therebetween, and the additional GND pattern may be provided in a GND of the relay means. As the additional GND pattern is provided at the GND of the relay means, it becomes unnecessary to increase the length or the diameter of the power supply cable for supplying power to the USB device from the power supply. This makes it easy to arrange the power supply cable.

The power supply is connected to the relay means and supplies power to the USB device with the relay means interposed therebetween. With such a configuration, there is no need in particular to redesign a connector of the USB device and instead existing connectors may be used. This expands a range of choices of USB devices.

According to the present disclosure, it is possible to effectively prevent stability of an operation from deteriorating for a USB device requiring a current value exceeding a current value setting in the USB 2.0 specification before a connection is permitted by a USB host.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to an embodiment of the present disclosure, the present disclosure according to claims is not limited to the following embodiment. Moreover, all the components described in the following embodiment are not necessarily indispensable for means to solve problems. For the clarification of the description, the following description and the drawings may be omitted or simplified as appropriate. Throughout the drawings, the same components are denoted by the same reference signs and repeated descriptions will be omitted as appropriate.

Figure 1:
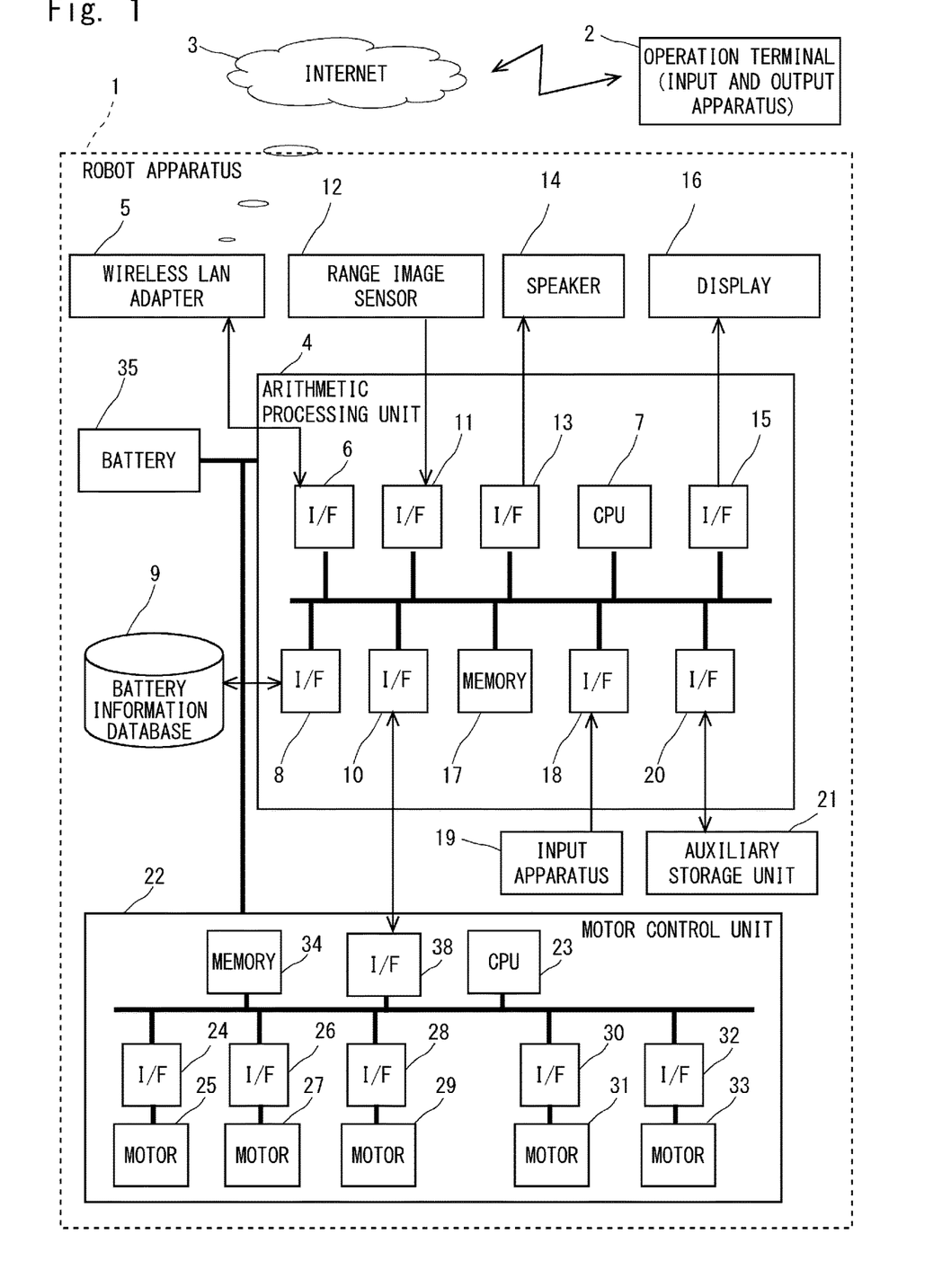
FIG. 1 is a block diagram showing an example of a configuration of a robot apparatus as an electronic unit according to an embodiment.

FIG. 1 is a block diagram showing an example of a configuration of a robot apparatus 1 as an electronic unit according to this embodiment. The robot apparatus 1 analyzes an input from a user or an input from a sensor, and provides information or performs operations such as transporting and moving objects. As shown in FIG. 1, the robot apparatus 1 includes an arithmetic processing unit 4, a wireless LAN adapter 5, a battery information database 9, a range image sensor 12, a speaker 14, a display 16, an input apparatus 19, an auxiliary storage unit 21, a motor control unit 22, and a battery 35.

The robot apparatus 1 captures voice information and text information from an operation terminal 2 into the arithmetic processing unit 4 via an Internet 3, a wireless LAN adapter 5, and an interface (I/F) 6. The arithmetic processing unit 4 captures information from a recognition sensor such as the range image sensor 12 into the arithmetic processing unit 4 via the interface 11 and temporarily inputs it into a memory 17 and performs analysis processing about whether calibration of the recognition sensor is necessary in the CPU 7.

The range image sensor 12 is a device (a USB device) using USB (Universal Serial Bus) for high-speed serial communication. The USB is widely used as interface means for connecting an external device to an electronic unit. The mode of acquiring driving power in a USB device is roughly divided into self power and bus power. The self power indicates driving power acquired from an internal battery or an external power supply (e.g., a commercial power supply) or indicates driving by this driving power. The bus power indicates driving power acquired from a USB host via a USB cable or indicates driving by this driving power. The range image sensor 12 is a bus powered USB device.

In this embodiment, the arithmetic processing unit 4 on an upstream side in a USB connection is referred to as a "USB host", and devices such as the range image sensor 12 on a downstream side as viewed from the USB host are collectively referred to as "USB devices".

A processing program in the arithmetic processing unit 4 is stored in the auxiliary storage unit 21. In the arithmetic processing unit 4, the CPU 7 reads this processing program via the interface 20, transfers the read processing program to the memory 17, and performs arithmetic processing as appropriate. Various data pieces and calculation results created by the arithmetic processing are accumulated in the memory 17 and are referred to as necessary.

The display 16 is for displaying a content of an output from the arithmetic processing unit 4 via an interface 15, and is, for example, a liquid crystal monitor. For example, the speaker 14 acquires a voice signal input to the arithmetic processing unit 4 via an interface 13 in response to a request from the user, and outputs the voice signal.

The input apparatus 19 is composed of a pointing device such as a mouse, a numerical value input apparatus such as a keyboard, and a voice input apparatus such as a microphone, and makes settings for an instruction and a threshold for the arithmetic processing unit 4 via an interface 18.

The motor control unit 22 controls motors (motors 25, 27, 29, 31, and 33) in the robot apparatus 1 via the respective interfaces (interfaces 24, 26, 28, 30, and 32). The motor control unit 22 receives a command from the arithmetic processing unit 4 via an interface 10 and an interface 38, and temporarily inputs the command in a memory 34. Then, the CPU 23 reads a processing program of the command stored in an auxiliary storage unit (not shown), transfers the processing program to the memory 34, and processes the command as appropriate. Various data pieces and calculation results required for motor control and accumulated in the memory 34 and referred to as necessary.

The battery 35 supplies power to the arithmetic processing unit 4 and the motor control unit 22. For example, a high capacity and high voltage secondary battery system such as a lithium ion battery is employed as the battery 35. The battery 35 includes sensors for measuring a voltage, a current, a temperature, and an ambient temperature of the battery 35. The battery 35 involves various signal processing (not shown in FIG. 1) in remaining capacity analysis processing. Numerical value data such as the voltage, the current, the temperature, the number of times of charging, etc., related to the battery 35 is stored in the battery information database 9. The battery information database 9 and the arithmetic processing unit 4 exchange the numerical data via the interface 8.

As described above, in the robot apparatus 1, the input from the user is performed by a voice signal via the input apparatus 19. The arithmetic processing unit 4 for analyzing the voice signal can be constructed relatively easily and can be achieved at low cost. Note that the configuration of the robot apparatus 1 is not limited to the one shown in FIG. 1, and the video and voice output unit such as the display 16 and the speaker 14 may be a built-in device or an external device.

The range image sensor 12 serving as the USB device and the arithmetic processing unit 4 serving as the USB host can be connected to each other by a USB cable with a GND via a USB port included in each of the range image sensor 12 and the arithmetic calculation unit 4. An additional GND pattern different from a GND pattern of the USB cable is electrically connected to the GND of the USB port of at least one of the USB host and the USB device. After the range image sensor 12 and the arithmetic processing unit 4 are connected to each other by the USB cable, a signal requesting for a connection permission is transmitted from the range image sensor 12 to the arithmetic processing unit 4.

The arithmetic processing unit 4 determines whether to permit the connection based on this signal.

Figure 2:
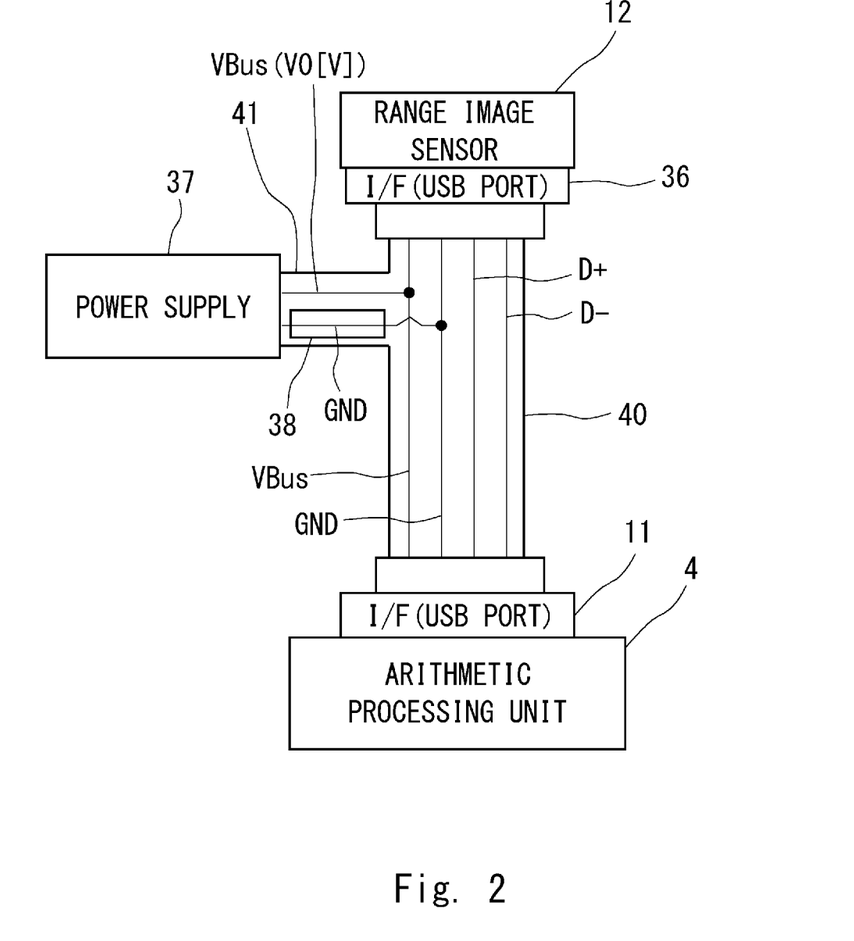
FIG. 2 is a schematic diagram showing an example of a connection between a range image sensor serving as a USB device and an arithmetic processing unit serving as a USB host in the robot apparatus according to the embodiment.

FIG. 2 is a schematic diagram showing an example of, in particular, a connection between the range image sensor 12 serving as the USB device and the arithmetic processing unit 4 serving as the USB host in the robot apparatus 1 according to this embodiment. As shown in FIG. 2, a USB port 36, which is an interface of the range image sensor 12, is connected to a USB port 11, which is an interface of the arithmetic processing unit 4, by a USB cable 40. The USB cable 40 includes a D+ line, a D− line, a GND line, and a VBus line. A GND line and a VBus line of a power supply cable 41 of a power supply 37 are connected to the GND line and the VBus line of the USB cable 40, respectively. It is preferable that a voltage V0 supplied from the power supply 37 to the range image sensor 12 be greater than 5.23 V and also be 5.25 V or less.

In the robot apparatus 1, when the energization of the range image sensor 12 is started, a current sufficient for the range image sensor 12 to start up is always supplied from the power supply 37. Then, even in the USB device (in this case, the range image sensor 12) requiring a current value exceeding the current value setting (100 mA) in the USB 2.0 specification before a connection is permitted by the USB host, the startup of the USB device will not become unstable due to an insufficient current.

An additional GND pattern 38 is provided in a GND connection path which connects the power supply 37 to the GND of the range image sensor 12 serving as the USB device. The additional GND pattern 38 may be formed by adding a GND line or by providing a plane of a GND pattern. The area of the additional GND pattern 38 is set to 2000 mm² or more. More preferably, the area of the additional GND pattern is set to 4000 mm² or more. When the additional GND pattern 38 is formed by adding a GND line, an area S [mm²] of the additional GND pattern 38 can be calculated by S=πdL, where a distance between the power supply 37 and the range image sensor 12 is L [mm], and a diameter of the GND line is d [mm]. For example, when the distance L between the power supply 37 and the range image sensor 12 is 2500 mm, the diameter of the GND line in order to achieve 2000 mm² as the area of the additional GND pattern 38 is about 0.25 mm, and the diameter of the GND line in order to achieve 4000 mm² as the area of the additional GND pattern 38 is about 0.51 mm.

Next, an effect achieved by electrically connecting the additional GND pattern 38 to the GND of at least one USB port (the USB port 11 or USB port 36) of the arithmetic processing unit 4 serving as the USB host and the range image sensor 12 serving as the USB device will be described.

In the USB 2.0 standard, a potential difference between GNDs ($V_{GNDD}$: GND Voltage drop), which is one of specifications, is specified as 125 mV at the maximum. The potential difference between the GNDs is a potential difference between the GND on the side of the USB host and the GND on the side of the USB device which is connected to the USB host by the USB cable. As a result of intensive research conducted by the present inventors, it has been found that the greater the potential difference between the GNDs with respect to 125 mV, the more noises there are, thereby making the startup of the USB device unstable.

In the USB 2.0 standard, $V_{HSCM}$ (High-speed data signaling common mode voltage range), which is one of the specifications, specifies that a minimum value is −50 mV and a maximum value is 500 mV. As a result of intensive research conducted by the present inventors, it has been found that the greater the potential difference between the GNDs with respect to 125 mV, the harder it is for $V_{HSCM}$ to fall within a specified range. When the $V_{HSCM}$ does not fall within the specified range, the startup of the USB device becomes unstable as well.

Figure 3:
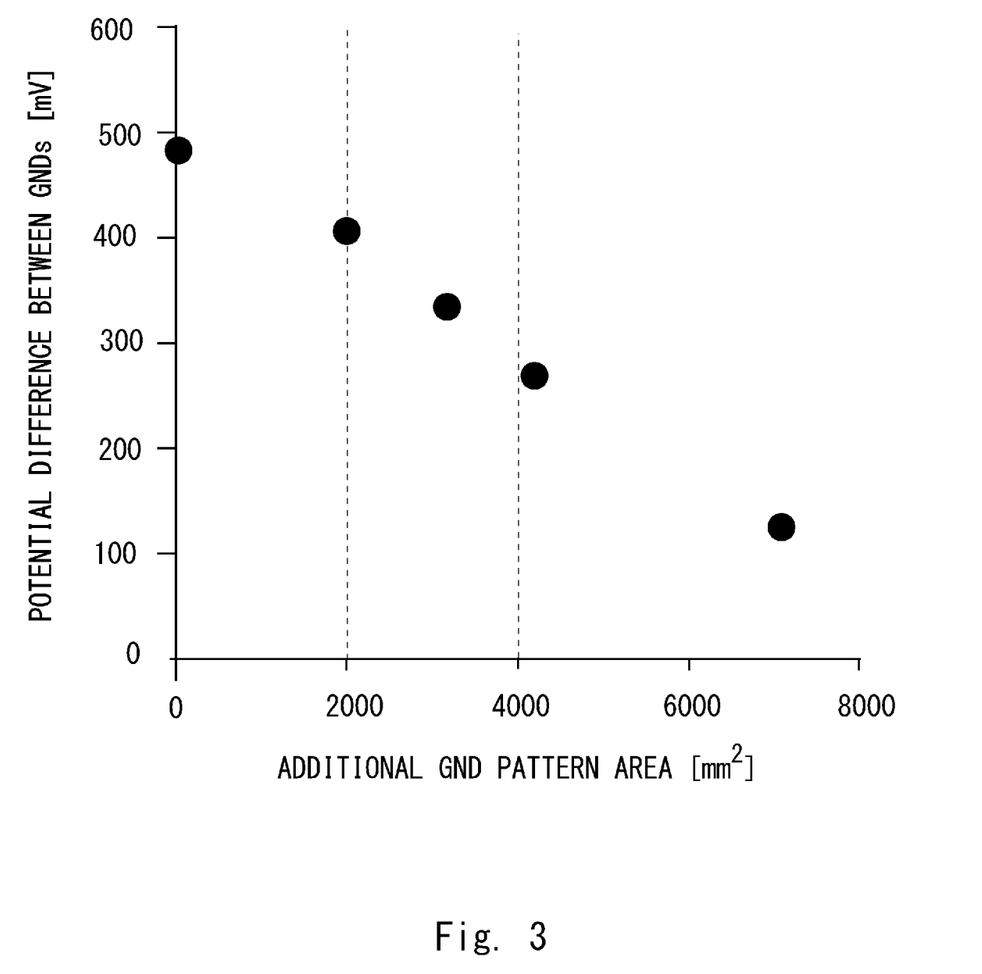
FIG. 3 is a graph of experimental results showing a relationship between an area of an additional GND pattern and a potential difference between GNDs.

The present inventors have experimentally confirmed the relationship between the area of the additional GND pattern 38 and the potential difference between the GNDs. FIG. 3 is a graph of experimental results showing the relationship between the area of the additional GND pattern 38 and the potential difference between the GNDs. In the graph, the vertical axis represents the potential difference between the GNDs, and the horizontal axis represents the area of the additional GND pattern 38. As shown in FIG. 3, it has been confirmed that the larger the area of the additional GND pattern 38, the smaller the potential difference between the GNDs becomes.

Figure 4:
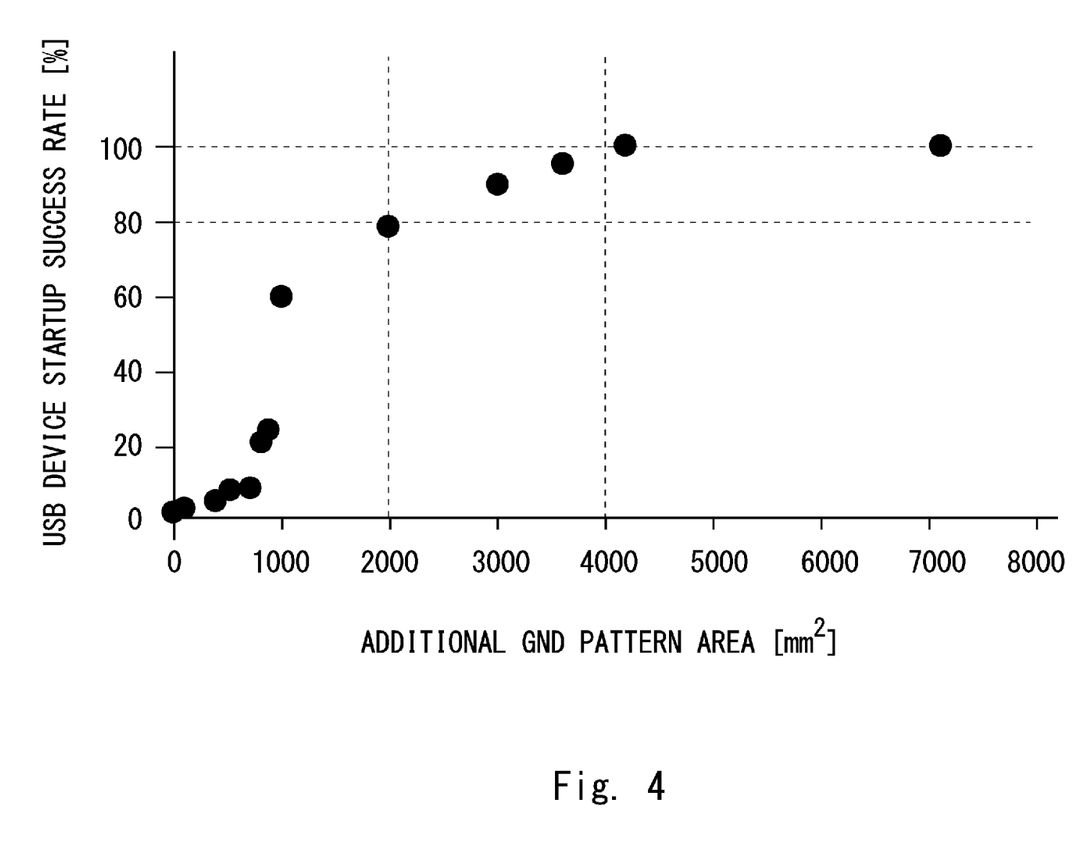
FIG. 4 is a graph of experimental results showing a relationship between the area of the additional GND pattern and a USB device startup success rate.

Further, the present inventors have experimentally confirmed the relationship between the area of the additional GND pattern 38 and a USB device startup success rate. FIG. 4 is a graph of experimental results showing the relationship between the area of the additional GND pattern 38 and the USB device startup success rate. In this graph, the vertical axis represents the USB device startup success rate, and the horizontal axis represents the area of the additional GND pattern 38. The USB device startup success rate here indicates the percentage of the number of times the range image sensor 12 serving as the USB device has normally operated when a robot is powered on 300 times. As shown in FIG. 4, it has been confirmed that when the area of the additional GND pattern 38 becomes 2000 mm², the USB device startup success rate is improved to about 80%. Further, it has been confirmed that when the area of the additional GND pattern 38 becomes 4000 mm² or more, the USB device startup success rate becomes 100% (i.e., startup of the range image sensor 12 never fails).

From the experimental results shown in FIGS. 3 and 4, in the robot apparatus 1 as the electronic unit according to this embodiment, when the area of the additional GND pattern 38 is set to 2000 mm² or more, it can be considered that the USB device startup success rate is improved to about 80%. Further, when the area of the additional GND pattern 38 is set to 4000 mm² or more, it can be considered that the USB device startup success rate can be made almost 100%.

As described above, the robot apparatus 1 as the electronic unit according to this embodiment includes the power supply 37 which supplies power to the range image sensor 12 serving as the USB device. The additional GND pattern 38 different from the GND pattern of the USB cable 40 is electrically connected to the GND of the USB port (the USB port 11 or USB port 36) of at least one of the arithmetic processing unit 4 serving as the USB host and the range image sensor 12 serving as the USB device. The area of the additional GND pattern 38 is 2000 mm² or more. It has been experimentally confirmed that the larger the area of the additional GND pattern 38, the smaller the potential difference between the GNDs becomes. It has been further experimentally confirmed that when the area of the additional GND pattern 38 is set to 2000 mm² or more, the USB device startup success rate is improved to about 80%. Therefore, in the electronic unit according to this embodiment, it is possible to effectively prevent the stability of the operation from deteriorating for the USB device requiring the current value exceeding the current value setting in the USB 2.0 specification before the connection is permitted by the USB host. Further, in a robot apparatus that routes a USB cable via a movable part, it is difficult to solve the problem of an unsuccessful startup of the USB device by inserting and removing the USB cable. In the robot apparatus 1 as the electronic unit according to this embodiment, it is possible to effectively prevent the stability of the operation from deteriorating, and thus it is not necessary to insert and remove the USB cable. This reduces the frequency of maintenance and repair.

Modified Example 1

Figure 5:
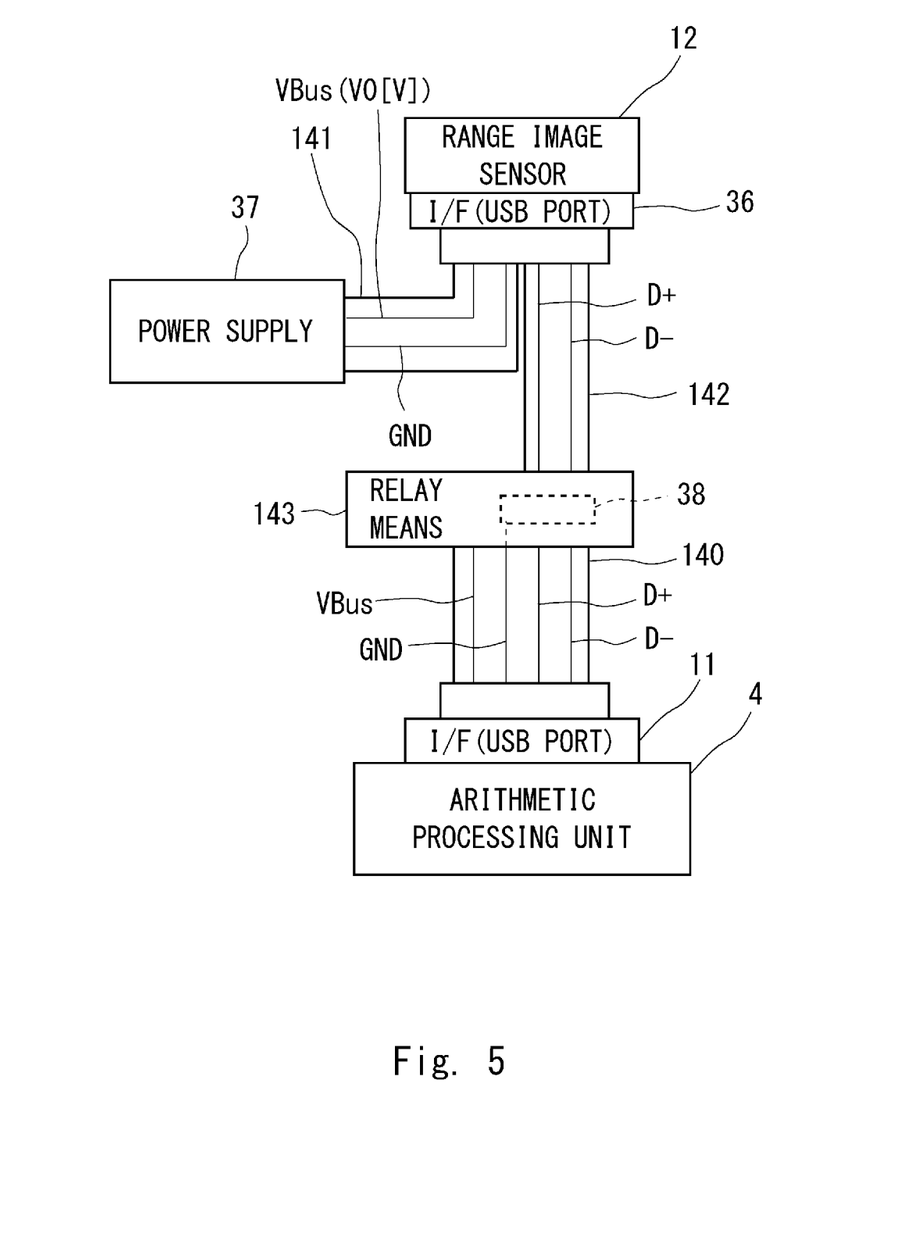
FIG. 5 is a schematic diagram showing a modified example 1 of the connection between a range image sensor serving as the USB device and the arithmetic processing unit serving as the USB host.

FIG. 5 is a schematic diagram showing a modified example 1 of the connection between the range image sensor 12 serving as the USB device and the arithmetic processing unit 4 serving as the USB host. As shown in FIG. 5, the arithmetic processing unit 4 serving as the USB host and the range image sensor 12 serving as the USB device are connected to each other with relay means 143 interposed therebetween. The relay means 143 is, for example, a USB hub for attaching a plurality of USB devices to one USB port of the USB host.

The power is supplied to the range image sensor 12 exclusively from the power supply 37 via a power supply cable 141. That is, the VBus of the range image sensor 12 is not connected to the VBus of the arithmetic processing unit 4, and the GND of the range image sensor 12 is not connected to the GND of the arithmetic processing unit 4. With such a configuration, a Vbus power supply can be supplied from the power supply 37 to the range image sensor 12 without depending on negotiations between the range image sensor 12 serving as the USB device and the arithmetic processing unit 4 serving as the USB host.

It is desirable that the voltage V0 supplied from the power supply 37 to the range image sensor 12 be greater than 5.23 V and also be 5.25 V or less. Further, the additional GND pattern 38 is provided as a plane of the GND pattern at the GND of the relay means 143. That is, the additional GND pattern 38 is provided, for example, as a plane of the GND pattern on a part of a circuit board of the relay means 143. The area of the additional GND pattern 38 is set to 2000 mm$^2$ or more. More preferably, the area of the additional GND pattern is set to 4000 mm$^2$ or more. By providing the additional GND pattern 38 as the plane of the GND pattern at the GND of the relay means 143, it becomes unnecessary to increase the length or the diameter of the power supply cable 141. This makes it easy to arrange the power supply cable 141.

Modified Example 2

Figure 6:
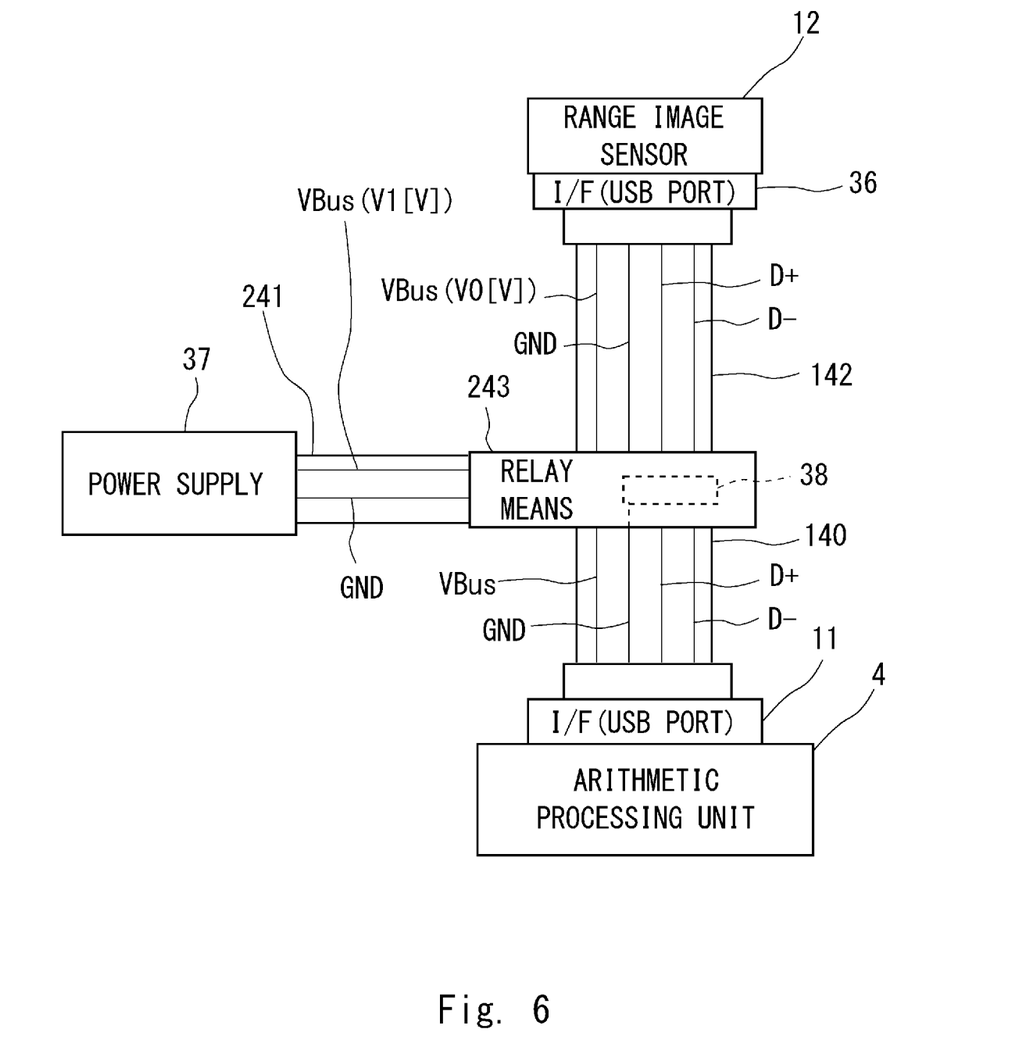
FIG. 6 is a schematic diagram showing a modified example 2 of the connection between the range image sensor serving as the USB device and the arithmetic processing unit serving as the USB host.

FIG. 6 is a schematic diagram showing a modified example 2 of the connection between the range image sensor 12 serving as the USB device and the arithmetic processing unit 4 serving as the USB host. As shown in FIG. 6, the connection between the arithmetic processing unit 4 serving as the USB host and the range image sensor 12 serving as the USB device is performed with relay means 243 interposed therebetween. The relay means 243 is, for example, a USB hub for attaching a plurality of USB devices to one USB port of the USB host.

The power supply 37 is connected to the relay means 243 via a power supply cable 241, and supplies power to the range image sensor 12 serving as the USB device via the relay means 243. With such a configuration, there is no need in particular to redesign a connector of the USB device, and instead existing connectors may be used. This expands a range of choices of USB devices. As a voltage V1 supplied from the power supply 37 to the relay means 243, 12 V or 5.25 V may be used. It is desirable that the voltage V0 supplied from the relay means 243 to the range image sensor 12 be greater than 5.23 V and also be 5.25 V or less. Further, the additional GND pattern 38 is provided as a plane of the GND pattern at the GND of the relay means 243. That is, the additional GND pattern 38 is provided, for example, as a plane of the GND pattern on a part of a circuit board of the relay means 243. The area of the additional GND pattern 38 is set to 2000 mm$^2$ or more. More preferably, the area of the additional GND pattern 38 is set to 4000 mm$^2$ or more.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An electronic unit comprising:
   a USB host and a USB device that can be connected to each other by a USB cable with a GND via a USB port included in each of the USB host and the USB device, wherein
   after the USB host and the USB device are connected to each other by the USB cable via the USB port, a signal requesting for connecting the USB device to the USB host is transmitted from the USB device to the USB host, and the USB host determines whether to permit a connection based on the signal, and the electronic unit further comprises:
   a power supply configured to supply power to the USB device; and
   an additional GND pattern different from a GND pattern of the USB cable is electrically connected to a GND of the USB port of at least one of the USB host and the USB device, wherein
   an area of the additional GND pattern is 2000 mm$^2$ or more.

2. The electronic unit according to claim 1, wherein the area of the additional GND pattern is 4000 mm$^2$ or more.

3. The electronic unit according to claim 1, wherein the additional GND pattern is provided in a GND connection path connecting the power supply to a GND of the USB device.

4. The electronic unit according to claim 1, wherein
   the USB host and the USB device are connected to each other with relay means interposed therebetween, and
   the additional GND pattern is provided in a GND of the relay means.

5. The electronic unit according to claim 4, wherein the power supply is connected to the relay means and supplies power to the USB device via the relay means.

* * * * *